United States Patent Office 2,855,818
Patented Oct. 14, 1958

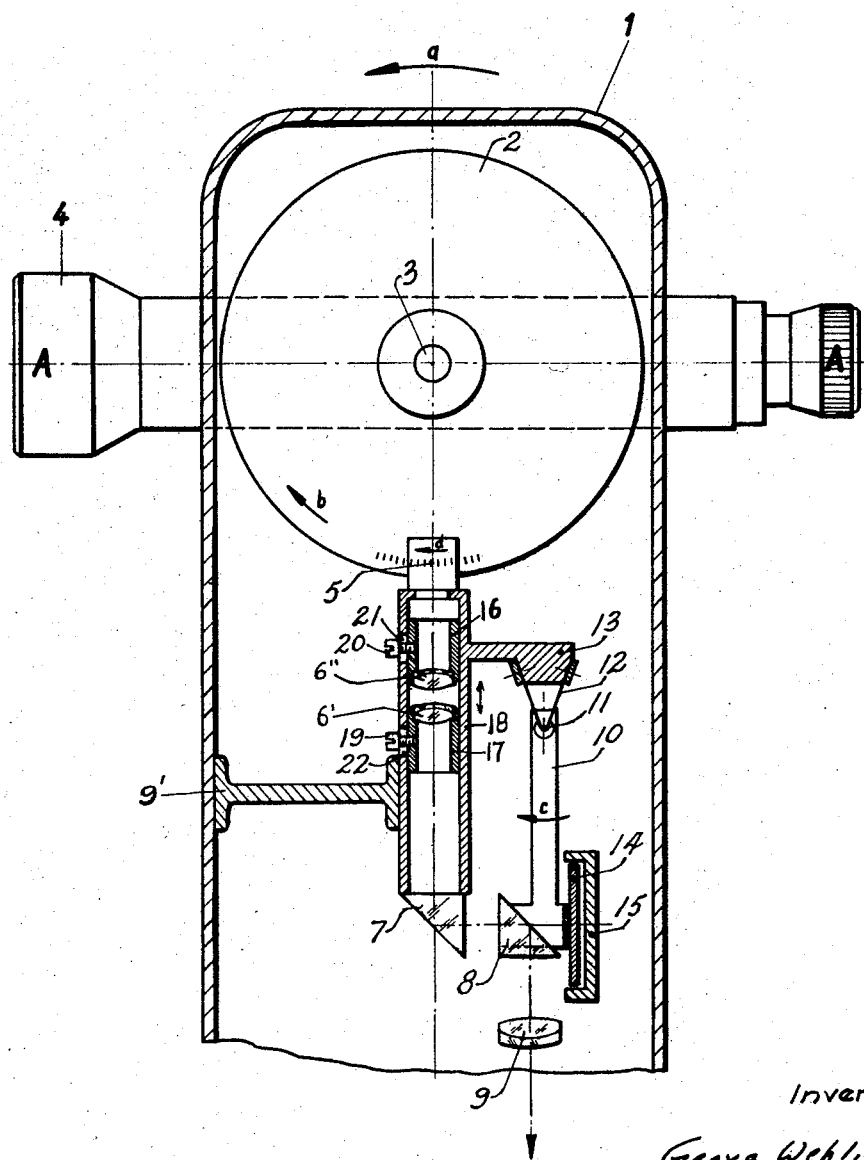

2,855,818

ALTITUDE READING MEANS FOR A THEODOLITE

Georg Wehling, Berlin-Lichterfelde, Germany, assignor to Askania-Werke A. G., Berlin-Friedenau, Germany, a corporation of Germany Application July 6, 1955, Serial No. 520,258

Claims priority, application Germany July 29, 1954

4 Claims. (Cl. 88—1)

This invention relates to a theodolite and particularly to the altitude reading means of such an instrument.

A main object of the invention is to provide highly accurate but also extremely simple altitude reading in a theodolite.

A more particular object is to automatically maintain accuracy in such reading even in the event that the position of the theodolite changes slightly while the instrument is in use, and to avoid any need for time-consuming and tedious manual readjustments in such event and likewise to avoid any need for cumbersome and expensive devices for the automatic correction.

These and other objects, as will appear from the following, have been achieved by a theodolite altitude circle reading system comprising front and back objective elements with telecentric ray trace therebetween and with a ray displacement unit therebetween, one element of the ray displacement unit being swingably suspended. The ray displacement unit is also utilized for other known purposes. The first focal length of the present front objective element is desirably one-half the radius of the altitude circle, subject to minor adjustment.

These and other features of the instrument will be understood more clearly upon a study of the detailed description of an embodiment, which follows.

The drawing is a very schematic vertical section through a theodolite altitude circle housing incorporating this invention; the section being taken in a plane parallel to that of the altitude circle.

The housing 1 has the altitude circle or disc 2 installed therein. A horizontal axle 3, pivoted in the housing, rigidly connects this circle with the theodolite telescope 4. A reading post, formed for instance by a mirror prism 5, is illuminated by suitable means, not shown, and transmits a reading of the altitude circle through a front objective unit 6, first and second mirror prisms 7 and 8, back objective lens 9 and ocular, not shown, to the observer's eye or camera; the reading post, objective unit and first prism being rigidly secured to the housing by bracket means 9' or the like. The second prism 8 forms a part of a pendulum 10, desirably a lower part and weight element thereof. The pendulum is suspended from a pivot 11 providing a plane of pendulum swing parallel to the plane of the altitude circle. The pivot 11 may be supported by four thin strips or wires 12, fastened to a carrier 13 which as shown may be rigid with the post 5. Pendulum oscillations are desirably dampened by a damping plate 14 which is rigid with the pendulum 10 and which cooperates with a suitable dashpot 15.

The first focal length of the front objective, extending from the principal point of the system 6 toward the altitude circle 2, desirably equals half the radius of the latter circle, so that tilting of the prism-pendulum system 8, 10 causes tilting of the line of sight between elements 5 and 6 in the manner of a lever, with the first focal length of the front objective as a lever arm; such leverage cancelling the doubling of the angle of tilt which is caused by the pendulum mirror system 8, 10.

Since the pendulum prism unit 8, 10 represents only a small weight it can be accurately pivoted on a very small and plain pivot pin 11, which in turn can be carried by very simple, thin wires or straps 12. In some respects it would be simpler to construct the entire reading mechanism in form of a lever swingable about the reading point on the altitude circle. However such a construction would be expensive as well as limited in accuracy, because of the weight of such a pendulum, and the requirements of a low friction fulcrum construction for it. For a small modern theodolite self-adjustment against altitude reading errors is practical only when provided by a swinging element forming a small part of the optical system, as contemplated herein. It is particularly desirable that the optical elements involved, such as prisms 7 and 8, should form part of a basic theodolite system as required for other purposes, known to the art, so that the only special requirement is, a fulcrum and dashpot arrangement 10 to 15 is a matter of insignificant cost, and the provision of specific optical conditions as described above, which is a matter of no cost whatsoever.

Even the thin wires or straps 12 suspending the pendulum fulcrum 11 have a certain degree of rigidity. As a result, irregular tilting of the theodolite instrument may cause some little distortion of the pendulum swing relative to the plane of the altitude circle 2. This in turn may cause some little modification of the theoretical ray trace from the altitude circle downwards. Such modification, however, can be compensated by slightly changing the first focal length of the front objective 6. For this reason the front objective 6 desirably has two or more elements 6', 6", longitudinally adjustable relative to one another in known manner, for instance, by means of element holders 16, 17 slidable in tube 18. Screws 19, 20, threaded into holders 16, 17, can be moved along slots 21, 22 in tube 18, when the screws are loose, and the proper focal power of combination 6 can thus be established.

In order to explain the operation of the present automatic tilt corrector, let it be assumed that the theodolite telescope 4 as shown has its axis A—A exactly horizontally adjusted and focused upon a fixed point in the field. Let it further be assumed that in this position, as once established, the reading system 5 to 9 reads exactly 90 degrees on the altitude circle 2. Now the entire theodolite may tilt by a small angle, for instance in the direction of arrow *a*; an event which occurs in practical use from time to time, for a variety of reasons, for instance because of inaccurate levelling of the instrument. When and as the telescope axis A—A is now readjusted into accurately horizontal position by refocusing upon the fixed point in the field, the circle 2 rotates relative to the instrument in the direction of arrow *b*, angularly opposed to the direction *a*. The angular rotation *b* represents the error in circle reading caused by the tilting of the instrument. It is compensated by the present pendulum optics as follows.

As the theodolite and its telescope 4 tilt in direction *a* the pendulum 10 swings relatively to the theodolite in the direction of the arrow *c*, counter to the arrow *a*. The resulting change in the distance between the prisms 7 and 8 has no effect on the reading of the microscope 6, 9 because of the telecentric design of the microscope's front objective 6, which causes the passage of parallel rays in each part of the system between the points 6 and 9. However the motion of the pendulum and prism causes a tilting of the microscope's line of sight: the angle of incidence and accordingly the angle of reflection of the line from the observer's eye through the objective element 9 and to the prism 8, or vice versa, is modified. Between the elements 7 and 8 this modification causes clockwise rotation of the line of sight relative to the prism 8. Again, between the fixed prism 7 and the reading post 5 the same line tilts in counterclockwise direction relative to the prism 7. This tilting modifies the relative directions between successive portions of the ray bundles in the telecentric portion of the system, while the rays of each of said portions, as inherent in the telecentric construction of the objective, remain parallel to one another. The overall effect of significance for the reading at 5 is that the line of sight tilts about the principal point of the compound objective 6 in the manner of a lever the length of the upper arm of which corresponds to the focal length of the front objective 6; such tilting being counterclockwise relative to the front objective 6. Thus the reading point in effect wanders in the direction of the arrow $d$; that is, in the same direction in which the 90 degree mark had previously, as mentioned, been displaced from the reading point of the microscope by the readjusting of the telescope. The angular displacement of the line of microscopic sight in direction $d$ equals twice the telescope's angular readjustment $b$. The automatic compensation $d$ covers a linear distance equal the linear displacement $b$ if and as the radii of circle 2 and of the focal power of optical element 5, 6 relate to one another as 2 to 1. It will be understood that in this sense, the radius of the circle 2 means a distance from the center of that circle to the reading point, whereas the radius of the focal power of the system 5, 6 means the distance from the principal point of that system through the mirror prism 5 to the reading point on the circle.

It will be noted that accurate automatic self-adjustment is obtained in this manner, without any need for manual micrometer readjustment of any indicator spirit level or the like. Likewise the automatic readjustment is considerably more accurate than it could be made by pendulum construction of the entire reading system. It is even more accurate than it can be made by the mere provision of some kind of pendulum element in a reading microscope system of such nature as has been used in theodolite circle readers according to prior constructions. The system according to the invention is quite independent of any accidental displacements of the fulcrum of the pendulum prism. In addition it is rather unimportant for present purposes how long the pendulum arm 11, 8 is and exactly where the pivot 11 is located in the instrument housing. By virtue of these features the design of a suitable mechanism is greatly facilitated, whereas unequaled precision of optical self-correction is obtained.

I claim:

1. In an altitude reading and automatically tilt correcting system for a theodolite telescope: a rigidly constructed, generally upstanding altitude circle housing; a generally horizontal axle pivoted in the housing, said axle having said telescope rigidly mounted thereon with the telescope axis intersecting the axle; an altitude circle in the housing, rigidly mounted on the axle, concentrically therewith and normal thereto; a pair of optical units jointly forming a microscope objective focussed on a point on the periphery of the circle, the first of said units being generally rigidly secured to said housing and having a principal point spaced from said point on the periphery of the circle by a distance substantially equal to one-half the radius of said circle, and said microscope objective being telecentric, whereby it transmits a bundle of rays, originating at said periphery, in directions from the first to the second unit which directions are parallel with one another between said units, in each successive part of the length of said bundle; and a small ray deflector system, entirely interposed between said units, said system comprising two deflectors having flat surfaces obliquely facing one another and also, respectively, facing said units, for forming said consecutive parts of said bundle, two of said consecutive parts being laterally displaced relative to one another and in generally parallel relationship with one another, means rigidly securing one of said deflectors to said housing, and pendulum means suspended in said housing for swinging in a vertical plane intersecting said rigidly mounted deflector, said pendulum means having the other deflector directly and rigidly mounted thereon for swinging therewith and for thereby modifying said generally parallel relationship of the laterally displaced parts of the bundle of rays.

2. In a system as described in claim 1, the feature that the deflector mounted on the pendulum means is a prism, said prism constituting the weight of the pendulum means.

3. In a system as described in claim 1, a system of thin, elongated elements having one end secured to the housing and the other end secured to the pendulum means to provide a pivot for the pendulum means.

4. In a system as described in claim 1, means for adjusting the focal length of the first of said units.

References Cited in the file of this patent

UNITED STATES PATENTS

| | | |
|---|---|---|
| 269,486 | Tennent | Dec. 19, 1882 |
| 1,722,209 | Gordon | July 23, 1929 |
| 2,238,032 | Burka et al. | Apr. 15, 1941 |
| 2,498,273 | Hillman | Feb. 21, 1950 |

FOREIGN PATENTS

| | | |
|---|---|---|
| 276,929 | Germany | Aug. 24, 1912 |
| 29,669 | Great Britain | Dec. 24, 1912 |
| 178,209 | Austria | Apr. 26, 1954 |

UNITED STATES PATENT OFFICE
CERTIFICATE OF CORRECTION

October 14, 1958

Patent No. 2,855,818

Georg Wehling

It is hereby certified that error appears in the printed specification of the above numbered patent requiring correction and that the said Letters Patent should read as corrected below.

Column 2, line 21, after "15" insert -- which --.

Signed and sealed this 20th day of January 1959.

(SEAL)
Attest:
KARL H. AXLINE
Attesting Officer

ROBERT C. WATSON
Commissioner of Patents